United States Patent [19]

Chszaniecki

[11] Patent Number: 4,768,389
[45] Date of Patent: Sep. 6, 1988

[54] APPARATUS FOR MEASURING THE MATERIAL PRESSURE IN A TWIN-SCREW EXTRUSION DEVICE

[75] Inventor: Siegfried Chszaniecki, Hanover, Fed. Rep. of Germany

[73] Assignee: Hermann Berstorff Maschinenbau GmbH, Hanover, Fed. Rep. of Germany

[21] Appl. No.: 52,985

[22] Filed: May 22, 1987

[30] Foreign Application Priority Data

May 23, 1986 [DE] Fed. Rep. of Germany ....... 3617380

[51] Int. Cl.⁴ .............................................. G01L 5/12
[52] U.S. Cl. .............................. 73/862.49; 73/862.54
[58] Field of Search ............... 73/761, 862.31, 862.29, 73/862.49, 862.54

[56] References Cited

U.S. PATENT DOCUMENTS

| 2,802,361 | 8/1957 | Tornberg | 73/862.49 |
| 4,089,216 | 5/1978 | Elias | 73/862.31 |
| 4,168,160 | 9/1979 | Stoferle et al. | 73/862.54 X |

FOREIGN PATENT DOCUMENTS

| 7241371 | 2/1974 | Fed. Rep. of Germany . | |
| 189150 | 4/1964 | Sweden | 73/761 |

*Primary Examiner*—Charles A. Ruehl
*Attorney, Agent, or Firm*—Foley & Lardner, Schwartz, Jeffery, Schwaab, Mack, Blumenthal & Evans

[57] ABSTRACT

An apparatus for measuring the material pressure in a twin-screw extrusion device, wherein adjustment bolts are employed as deformation components for returning the axial back-pressure of the screws to the housing of the extrusion device, the deformation components having strain gauges affixed thereto.

1 Claim, 1 Drawing Sheet

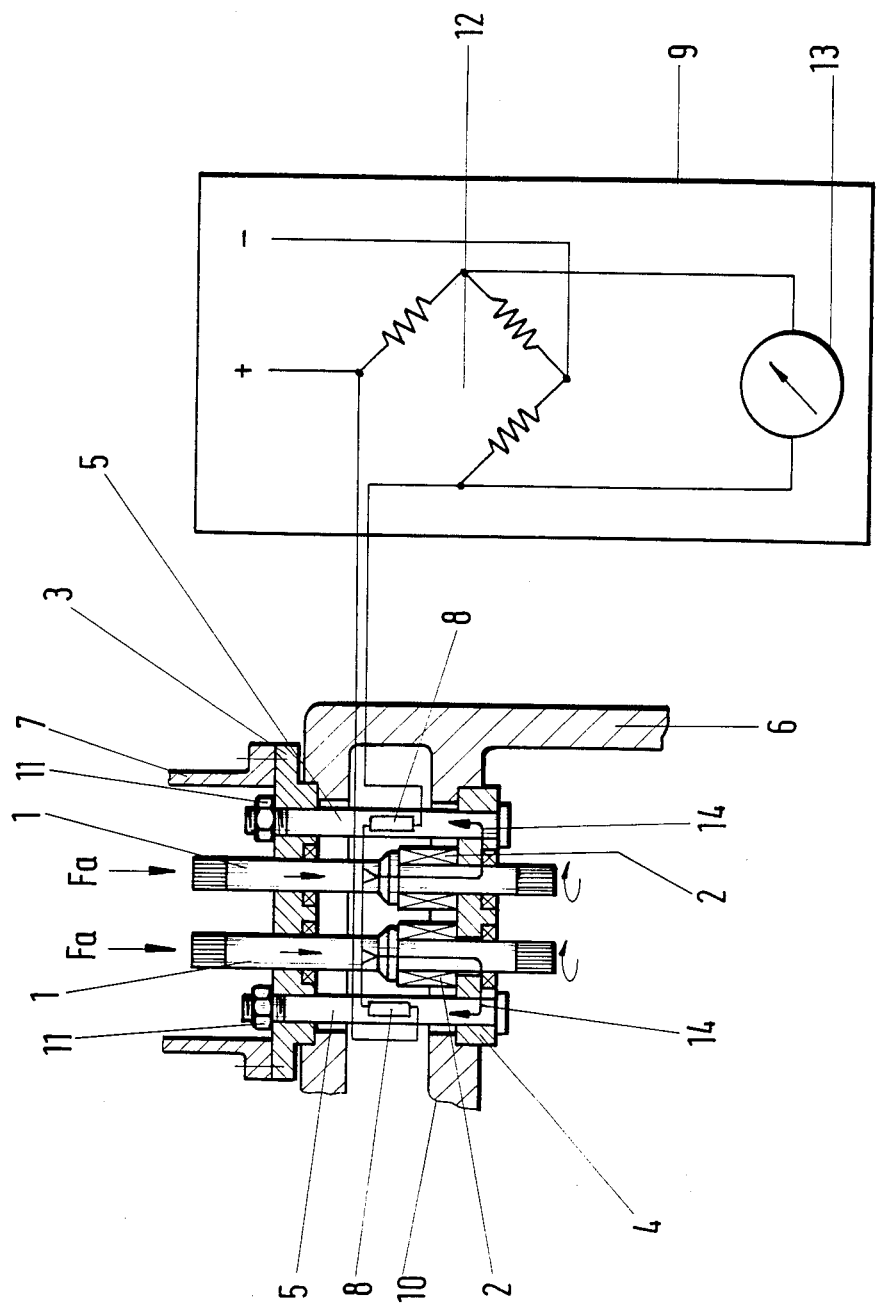

APPARATUS FOR MEASURING THE MATERIAL PRESSURE IN A TWIN-SCREW EXTRUSION DEVICE

FIELD OF THE INVENTION

The present invention relates to an apparatus for measuring the material pressure in a twin-screw extrusion device. More particularly, the present invention relates to an apparatus for measuring the material pressure in a twin-screw extrusion device by determining the axial back-pressure on the screws. Such back-pressure acts in opposition to a deformation member.

BACKGROUND OF THE INVENTION AND PRIOR ART DISCUSSION

In German Gebrauchsmuster (Utility Model) No. 72 41 371 there is disclosed a screw extrusion device which includes a measuring apparatus suitable for measuring the axial back-pressure exerted upon the plasticising screw. At the end of the plasticising screw which is subjected to an axial back-pressure, a disc-shaped deformation element or component is provided behind a back-pressure bearing, and a strain gauge in the form of semi-conductor expansion measuring strips is bonded or adhered to the deformation component. The expansion measuring strips are connected to a suitable measuring and indicating apparatus.

Additional component parts are required internally of the transmission for the mounting of the disc-shaped deformation component, thereby rendering the gear or back-pressure bearing considerably more expensive to produce.

Furthermore, it is not possible to provide corresponding, disc-shaped deformation components for both screws. This is because the space which such components would occupy behind the second shaft is required for the output shaft itself. An annular deformation component disposed behind the back-pressure bearing of the second screw shaft would be considerably more expensive than a conventional disc-shaped deformation component.

OBJECTS OF THE INVENTION

The present invention seeks to provide an apparatus for measuring the material pressure in a twin-screw extrusion device, which apparatus can be realised without the need for providing the transmission or back-pressure bearing with additional components.

Furthermore, the present invention seeks to provide an apparatus which permits the back-pressure for each screw, that is to say the material pressure in the twin-screw extrusion device, to be measured separately without the need for any additional components.

SUMMARY OF THE INVENTION

In accordance with the present invention, there is provided an apparatus for measuring the material pressure in a twin-screw extrusion device by determining the axial back-pressure on said screws, said extrusion device including a housing surrounding said screws and flange member means forming one end of said housing, said apparatus comprising a transmission housing disposed opposed to said flange member means, deformation means disposed within said transmission housing and strain gauge means attached to said deformation means, said apparatus further including visual indication means connected to said strain gauge means for indicating the force acting thereon wherein said deformation means comprises adjustable bolt members interconnecting said flange member means and said transmission housing whereby the axial back-pressure acts on said bolt members and is measured by said strain gauge means, the force of said back-pressure being returned to said flange member means through said bolts.

If the adjustable bolts for transmitting the axial back-pressure forces to the housing of the extrusion device are provided so as to act as carriers or support members for the wire strain gauges, it becomes possible for the back-pressure forces of the two screws, that is to say, the material pressure in the extrusion chamber to be measured without the necessity of providing any additional components on the back-pressure bearing or in the transmission system.

Conventional pressure measuring apparatuses for determining the material pressure in the barrel of an extrusion device are somewhat unreliable and, in addition, they only indicate the pressure at one specific location in the interior of the extrusion chamber.

BRIEF DESCRIPTION OF THE DRAWINGS

One embodiment of an apparatus in accordance with the present invention will be further described, by way of example, with reference to the accompanying drawings, the single FIGURE of which shows a sectional view of the output shafts of a twin-screw extrusion device coupled to a measuring apparatus.

DESCRIPTION OF PREFERRED EMBODIMENT

In the drawing, there is shown the screw output shafts of two meshing screws (not shown) of an extrusion device. The screw output shafts 1 are mounted in back-pressure bearings 2. The extrusion device includes a housing (not shown) which is provided with a connecting flange 7. The flange 7 is sealed by means of a flange cover 3.

A bearing flange 4 is disposed in a wall member 10 of a housing 6 for receiving adjustment bolts 5. Corresponding end regions of the adjustment bolts are screw-connected to the flange cover 3 by means of nuts 11.

Strain gauges in the form of semi-conductor expansion measuring strips 8 are disposed on the adjustment bolts 5 and are calibrated with respect to the diameter and the properties of the material from which the adjustment bolts are formed. A measuring device 9 is connected to the strips 8.

The measured values are determined by means of the measuring device 9 which, in this embodiment, is in the form of an electrical bridge circuit. The device is connected to an indicating instrument, such as a voltmeter 13, and a value indicative of the back-pressure is shown thereon.

The arrows 14 indicate the path of the force emanating from the output shafts 1 and passing through the back-pressure bearings 2 to the bearing flange 4, onto the adjustment bolts 5 and thence to the flange cover 3.

In such a case, the adjustment bolts 5, which are in the form of deformation components, are caused to expand depending on the level of the back-pressure force. Such expansion is accurately determined by the strain gauges in the form of semi-conductor expansion measuring strips and is visually indicated on the indicating instrument 13 by the measuring and indicating device 9.

It is then possible to introduce appropriate countermeasures to the extrusion apparatus based on the value measured. For example, the barrel (not shown) of the extrusion device may be heated more intensely so that the viscosity of the thermoplastic material is reduced which causes the pressure or back-pressure in the barrel of the extrusion device to be reduced. For safety reasons, the measuring and indicating apparatus may also be connected to a safety cut-out device apparatus for disconnecting the drive to the extrusion device.

I claim:

1. An apparatus for measuring the material pressure in a twin-screw extrusion device by determining the axial back-pressure on said screws, said extrusion device including a housing surrounding said screws and flange member means forming one end of said housing, said apparatus comprising a transmission housing disposed opposed to said flange member means, deformation means disposed within said transmission housing and strain gauge means attached to said deformation means, said apparatus further including visual indication means connected to said strain gauge means for indicating the force acting thereon wherein said deformation means comprises adjustable bolt members interconnecting said flange member means and said transmission housing whereby the axial back-pressure acts on said bolt members and is measured by said strain gauge means, the force of said back-pressure being returned to said flange member means through said bolt members.

* * * * *